C. A. WILKINS.
DEVICE FOR MEASURING WELLS.
APPLICATION FILED OCT. 19, 1916.
1,251,152.
Patented Dec. 25, 1917.
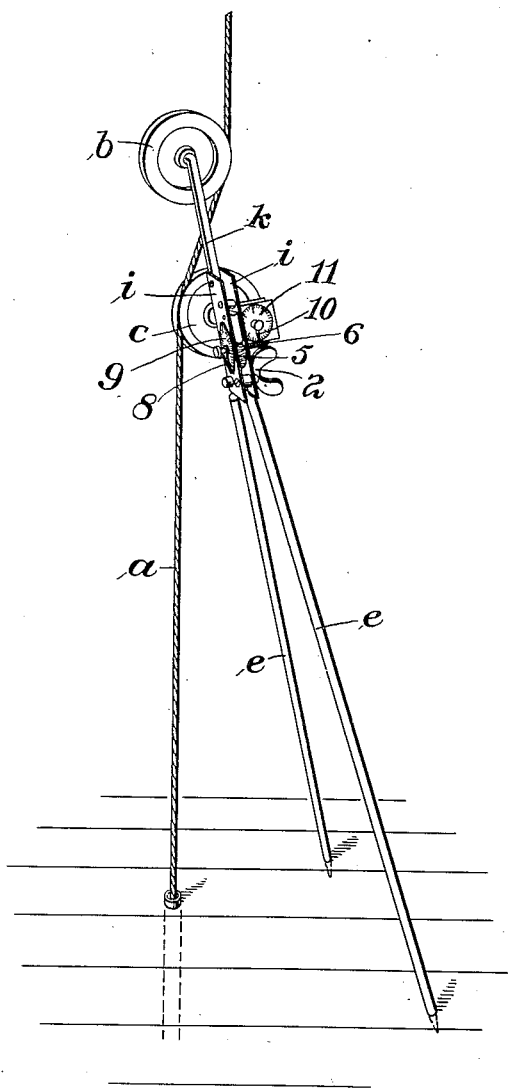
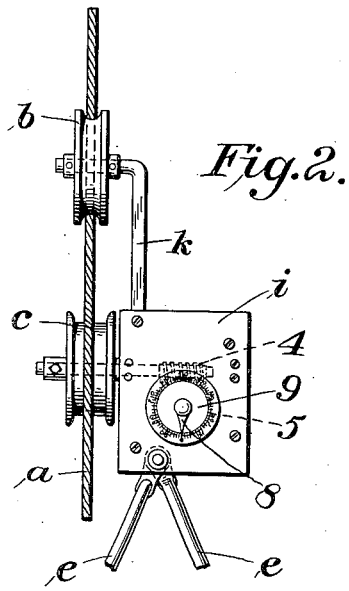
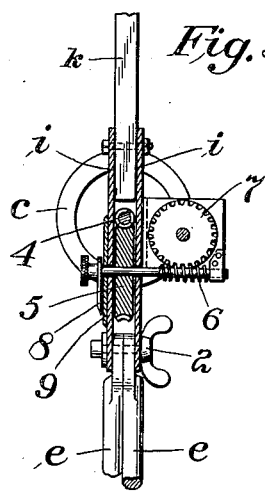
Inventor:
Charles A. Wilkins,
by Spear Middleton Donaldson Spear
Attys.

UNITED STATES PATENT OFFICE.

CHARLES A. WILKINS, OF BRADFORD, PENNSYLVANIA.

DEVICE FOR MEASURING WELLS.

1,251,152.  Specification of Letters Patent.  Patented Dec. 25, 1917.

Application filed October 19, 1916. Serial No. 126,594.

*To all whom it may concern:*

Be it known that I, CHARLES A. WILKINS, a citizen of the United States, residing at Bradford, Pennsylvania, have invented certain new and useful Improvements in Devices for Measuring Wells, of which the following is a specification.

My invention relates to certain new and useful improvements in measuring devices, and relates particularly to a device adapted for the measuring of wells, such as artesian wells, oil and gas wells, and the like. In the drilling of such wells it is often desirable to determine the exact depth of the well. This has heretofore been very difficult.

The object of my invention is to construct a device which is adapted to bear against the cable or rope, as it is lowered into or withdrawn from the well, and this rope or cable actuates the driving mechanism to operate the register or indicator.

To describe my invention briefly, I might say, it is a device adapted to be self supporting, comprising in detail two standards and a plurality of pulleys arranged one above the other, the cable traveling between these pulleys operating a suitable registering mechanism.

In describing my invention in detail reference is made to the accompanying drawings forming part of the specification, and wherein like numerals indicate corresponding parts throughout the several views, in which—

Figure 1 is a perspective view.

Figs. 2 and 3 are detail views enlarged over Fig. 1.

In carrying out my invention, I use two adjustable standards or supports *e e*, adapted to be driven into the floor or ground sufficiently to prevent the ends from slipping when the device is in operative position. The registering or indicating mechanism is adapted to be carried upon a suitable base which is removably secured to the upper end of the standards by means of a set screw 2. The base or support for the registering mechanism is composed of two sheet metal plates *i i*. These metal plates also support the pulleys *b* and *c*. The pulley *c* bears against one side of the cable *a*, which is thereby pressed back by means of the weight of the device, whereas the guide pulley *b*, bears against the opposite side of the cable *a* and is arranged directly above the pulley *c* by a bracket *k*, whereby tension is maintained on the cable *a*, which causes the pulley *c* to revolve when the cable is lowered into or withdrawn from the well. The revolutions of the pulley *c* rotate the worm gear 4, arranged on one end of the spindle which carries the pulley *c*. The worm gear 4 is in mesh with a gear 5 which operates the indicating finger 8 to register the number of feet up to one hundred (100) upon the dial face 9. As the gear 5 operates the indicator finger 8 it also operates a second worm gear 6, which is in mesh with a gear 7 to rotate a second indicating finger 10 to register the number of feet up to six thousand (6000) upon the dial face 11.

By the use of such recording disks, it will be observed that the device, which is readily removable, to any point of observation after the cable stops, may be utilized in the dark, or in a well from which gas is escaping, and where consequently no fire is permissible, and the depth can be readily ascertained from the register at a later time and in another place free from danger.

It will also be observed that the device, by reason of its sharp pointed standards, may be readily located and removed, and can be made to assume any angle, so that the operator can keep far enough away from the direct line of the well opening to be free from the spatter of the oil or water thrown off by the rope or cable.

In the practice of my invention it will be observed that various changes may be made in the details of construction without departing from the general spirit of my invention.

Having fully described my invention, what I claim, and desire to secure by Letters Patent, is:—

1. A device of the class described comprising two converging legs, a body member supported thereby, a pulley journaled in said member and projecting laterally therefrom, line measuring and registering means co-acting with said pulley and carried by said member, an arm projecting from said member, and a pulley carried by said arm located in the plane of the first mentioned pulley.

2. The device of claim 2 with the body member comprising two spaced plates with the lateral pulley's journal and the arm supported between the plates, and components of the registering and measuring means being carried exteriorly of said plates.

3. A device for measuring depths of wells in which a cable is used, comprising a frame, a pulley carried by the frame in contact with the cable, a measuring and registering device connected with said pulley, means for incompletely supporting said frame, and means supported from the frame for engaging the cable when the entire device is in leaning position whereby the cable completes the support of the device and suitable tension is simultaneously secured upon said pulley by means of the weight of the device.

In testimony whereof I affix my signature.

CHARLES A. WILKINS.